No. 778,157. PATENTED DEC. 20, 1904.
J. W. TODD & M. L. SANSBERRY.
NUT LOCK.
APPLICATION FILED SEPT. 12, 1904.
NO MODEL.

WITNESSES: INVENTORS
J. W. Todd
and M. L. Sansberry
BY Franklin N. Hough
Attorney No. 778,157.                                    Patented December 20, 1904.

UNITED STATES PATENT OFFICE.

JOHN W. TODD AND MARGARET L. SANSBERRY, OF DUNKIRK, INDIANA.

NUT-LOCK.

SPECIFICATION forming part of Letters Patent No. 778,157, dated December 20, 1904.

Application filed September 12, 1904. Serial No. 224,154.

*To all whom it may concern:*

Be it known that we, JOHN W. TODD and MARGARET L. SANSBERRY, citizens of the United States, residing at Dunkirk, in the county of Jay and State of Indiana, have invented certain new and useful Improvements in Nut-Locks; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks; and the object of the invention is to produce a simple and efficient device of this character in which the ordinary threaded bolt is employed which passes through a washer having spurs upon one edge thereof adapted to grip an object to prevent the washer from rotation and in the provision of a nut having a series of radial grooves in one face thereof which are adapted to register with a groove upon the outer face of the washer and to receive a locking-pin which has a split end designed to engage the opposite tapering walls of the thread and to be frictionally held against the same to prevent the nut from turning upon the bolt.

Our invention is clearly illustrated in the accompanying drawings, which, with the letters of reference marked thereon, form a part of this application, and in which drawings similar letters of reference indicate like parts in the views, in which—

Figure 1:
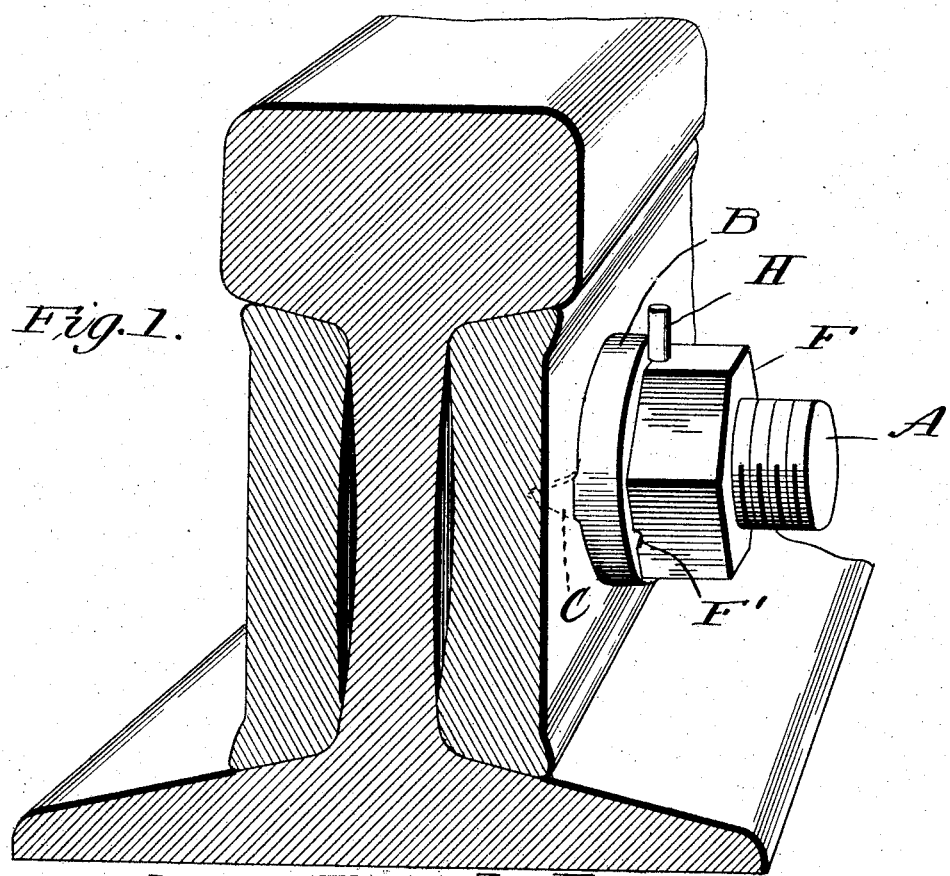
Figures 2, 6:
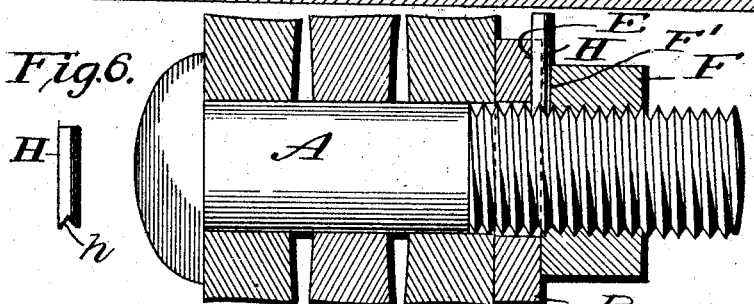
Figures 3, 4, 5:
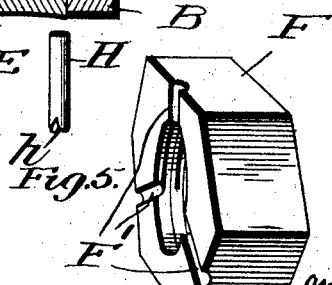

Figure 1 is a cross-sectional view showing the application of our improved nut-lock. Fig. 2 is a longitudinal sectional view through the bolt. Fig. 3 is a detail view of one face of the nut. Fig. 4 is a detail view of the washer. Fig. 5 is a detail view of the locking key or pin. Fig. 6 is an enlarged detail view showing the serrations in the ends of the key.

Reference now being had to the details of the drawings by letter, A designates a bolt which may be passed through any object and is provided with a head.

B designates a washer which is centrally apertured to receive the bolt, and said washer is provided on its inner face with spurs C, which are adapted to engage the rail, fish-plate, or other object through which the bolt passes, and the outer face of said washer has a radial groove E.

F designates a nut of ordinary construction fitted upon the threaded portion of the bolt and is provided with a plurality of radial grooves F' upon the inner face thereof, one or the other of said grooves F' being adapted to be brought into registration with and adjacent to the groove in the washer when it is desired to lock the nut from rotation.

When the nut has been placed upon the bolt and turned into position to receive the pin, the latter (designated by letter H) is inserted in the registering grooves of the nut and washer. Upon examination of said pin or key it will be observed that one end thereof is slitted, the walls of the slit being slightly serrated, as at $h$. Said walls are inclined and adapted to frictionally engage the tapering walls of the thread of the bolt, whereby as the pin is driven in the walls of the slit may be caused to grip the inclined walls of the thread of the bolt and prevent the nut from rotation.

When it is desired to loosen the nut, the operator may cause the pin or key to be withdrawn from the registering grooves, after which the nut may be allowed to be loosened.

While we have shown a particular form of nut-lock embodying the features of our invention, it will be understood that we may vary the device as to details, if desired, without in any way departing from the spirit of the invention.

Having thus fully described our invention, what we claim as new, and desire to secure by Letters Patent, is—

A nut-lock comprising, in combination with a bolt, a washer fitted upon the bolt and provided with spurs adapted to hold the washer from rotation by engagement with a fixed object, a nut mounted upon the threaded portion of the bolt, the adjacent faces of said washer and nut being provided with radial grooves, a key adapted to be inserted in said grooves and provided with a split end, the walls of the split portion of the pin being slightly serrated and inclined, designed to engage the opposite inclined walls of the thread of the bolt, as set forth.

In testimony whereof we hereunto affix our signatures in presence of two witnesses.

JOHN W. TODD.
MARGARET L. SANSBERRY.

Witnesses:
WILLIAM H. HUBBARD,
W. S. BERRY.